United States Patent Office 3,434,347
Patented Mar. 25, 1969

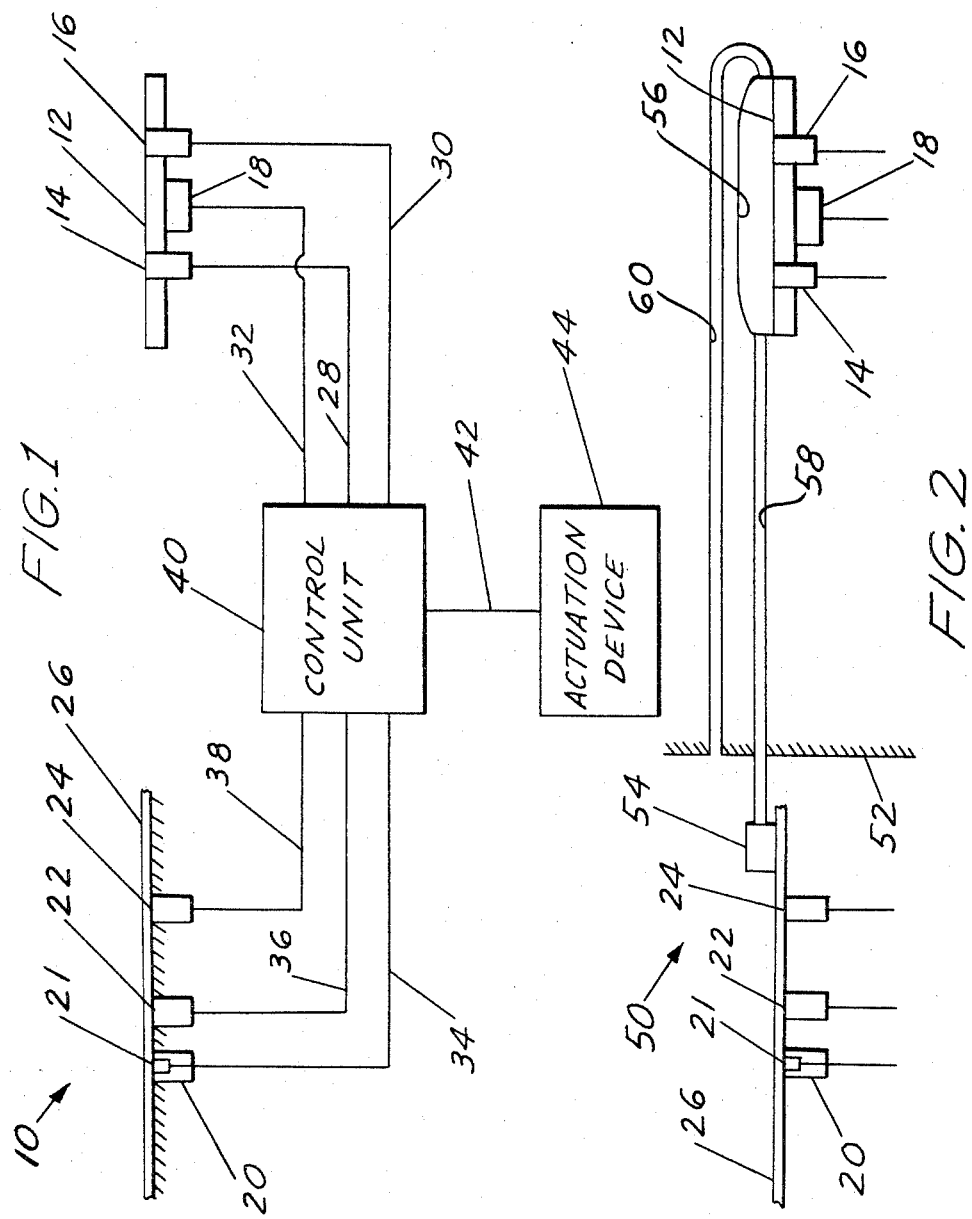

3,434,347
ICE CONDITION DETECTING DEVICE
Leon J. Lockwood, Southfield, Mich., assignor to Holley Carburetor Company, Warren, Mich., a corporation of Michigan
Filed June 23, 1966, Ser. No. 559,835
Int. Cl. G01n 25/56
U.S. Cl. 73—336                               12 Claims

ABSTRACT OF THE DISCLOSURE

An atmospheric condition anticipating device for use with a selected surface employs a second controlled surface and temperature sensing elements for sensing the temperatures of both surfaces. Means are provided for maintaining the temperature of the controlled surface in a predetermined relationship with respect to the temperature of the selected surface and further means are provided for producing an output signal whenever condensation, frost, ice, snow or water has formed on the controlled surface and the temperature of the selected surface is below a predetermined value.

---

This invention relates generally to atmospheric condition detecting and indicating devices, and more particularly to a device comprising a combination of known elements for anticipating or detecting a dew point and a possible icing condition on any particular surface (a road or an aircraft wing, for example) due to condensation, and for additionally detecting the presence of precipitated snow or ice on the surface in question.

In order to detect a condensation condition, it is necessary to consider the proximity of the surface temperature to the saturation temparature of the atmosphere surrounding the surface, and a number of methods have been used in the past for determining these temperatures. For temperatures above freeznig, wet bulb and dry bulb thermometers have been used. Another method has been to constantly "create" and measure the saturation temperature with a dew point hygrometer and to compare it with the surface temperature. Still other methods have utilized relative humidity transducers coordinated with surface temperature transducers to indicate a condensation condition.

A primary object of the invention is to provide a novel simplified system fo rsensing such a condition, without having to use wet and dry bulb thermometers, dew point hygrometers and/or relative humidity transducers.

Another object of the invention is to provide such a system which may be used solely for anticipating ice due to condensation at a freezing temperature dew point, or which may also include means for detecting the presence of ice resulting from precipitation or free water at freezing temperatures.

A further object of the invention is to provide such a system wherein the temperature of a selected surface is maintained at a predetermined differential from the temperature of a surface which is to be protected from ice and used as a means for anticipating the occurrence of frost on the latter surface.

A more specific object of the invention is to provide such a system which includes temperature and condensation sensors for use on a controlled surface, heated free water and unheated free water or ice probes and a temperature probe for use on a surface whereon an icing condition is to be either prevented or detected and an associated control unit which maintains the temperature of the controlled surface at a predetermined value below the temperature of the critical surface and which produces an output indicative of condensation or precipitation when the critical surface temperature is below freezing.

Other objects and advantages of the invention will become more apparent when reference is made to the following specification and the accompanying drawings wherein:

FIGURE 1 is a schematic illustration of a device embodying the invention; and

FIGURE 2 is a fragmentary schematic illustration of a modification of the device shown by FIGURE 1.

Referring now to the drawings in greater detail, FIGURE 1 illustrates an atmospheric condition detecting system 10 which includes a member 12 made from any suitable material, such as G–10 printed circuit board or glass cloth filled with an epoxy-type resin material, which serves as a so-called "controlled" surface for a purpose to be described. A temperature probe or transducer 14 which is known in the art and which may comprise means such as a variable resistor (not shown), and a suitable condensation probe 16, which may include a pair of electrodes such as that shown by FIGURE 4 of Jenson 3,056,935, are mounted in the member 12, preferably with the uppermost surfaces thereof on the same plane as that of the uppermost surface of member 12. As is known in the art, the electrodes may consist of grids formed from gold plated copper laminated in a "comb shape" on the above mentioned glass cloth. Alternatively, the condensation probe 16 may comprise an optical system, well known by those skilled in the art. A suitable "cooler" circuit, which is known by those skilled in the art. A suitable "cooler" circuit, which is known in the art and represented schematically at 18, is operatively connected to the member 12 for a purpose to be described.

A free water probe 20, including a pair of electrodes and a heating element 21, as shown by FIGURE 4 of U.S. application Ser. No. 559,153, filed June 21, 1966 in the name of Leon J. Lockwood, a free water or ice probe 22, including a pair of unheated electrodes, as shown by FIGURE 5 of the Lockwood application, and a surface temperature transducer 24, which may be similar or identical to transducer 14, are mounted in a particular surface, represented generally at 26, whereon the formation of ice is to be either prevented or detected. The uppermost surfaces of both pairs of electrodes in probes 20 and 22 are on substantially the same plane as that of the surface 26, for a purpose to be described.

Wire leads 28, 30, 32, 34, 36 and 38 connect the elements 14, 16, 18, 20, 22 and 24, respectively, to a control unit 40. The unit 40 includes suitable comparator and other logic circuit components, not shown but familiar to those skilled in the art, for (1) providing a thermoelectric cooler current, in accord with the well known Peltier effect, via the line 32 to the circuit 18, in order to control the temperature of the surface 12 relative to the temperature of the selected surface 26, and (2) producing an output indicative of condensation on the controlled surface 12, which is protected from precipitation, or precipitation on the unprotected surface 26, provided such condensation or precipitation occurs while the temperature of the surface 26 is below freezing temperature.

An additional wire lead 42 carries the above mentioned output from the control unit 40 to an actuation device, represented generally as 44 and including, for example, means such as a source of heat for preventing ice formation on the surface 26 or a visual signal for indicating the presence of ice on the surface 26.

Operation

First, it is clear that saturation temperature or dew point, at which condensation occurs, is for any particular relative humidity less than 100%, always a predeterminable amount below ambient temperature. Secondly, condensation will not occur on a particular surface unless the temperature of that surface is equal to or below the above mentioned saturation temperature. Lastly, in order for a freezing condition to occur as a result of condensation, it is necessary that the surface temperature be below 32° F., in addition to being lower than the saturation temperature, the initial result being the formation of frost.

With the above basic information in mind, refer now to FIGURE 1. The temperature transducer 24, imbedded in the surface 26, which may be a roadway, senses the temperature of that surface and supplies this information to the control unit 40 via the line 38. At the same time, the control unit 40 is receiving a temperature signal via the line 28 from the transducer 14 associated with the surface 12. The control unit 40 compares these signals and supplies a thermoelectric cooler current to the apparatus 18, as required to maintain the temperature of the surface 12, which may be located off the roadway and protected from precipitation, as by a cover, a predetermined amount different from the temperature of the surface 26.

Normally, the desirable surface 12 temperature would be slightly below the surface 26 temperature, say 1 or 2° F., in order to assure that condensation will occur first on the surface 12, thereby "anticipating" condensation on the selected surface 26. However, in some applications, it may be desirable to maintain the surface 12 at the same temperature as surface 26, or slightly higher. Such could be the case where it is known that the initial frost condensation is not harmful.

The electrodes in probe 16 will react to the occurrence of condensation thereon by supplying a signal to the control unit 40 via the line 30. Should such a signal occur, and if the signal from the temperature probe 24 is indicative of a below freezing surface 26 temperature, the unit 40 is of such a design that it will transmit a signal via the line 42 to the actuation device 44. The device 44 will thereupon either energize a source of heat for the surface 26 and thus prevent the formation of ice thereon, such as on the inlet of a gas turbine engine, or energize a visual signal, such as an electric warning sign along a highway, stating that a bridge or other normally colder surface ahead is icy. For the former application, condensation should be anticipated, i.e., have the surface 12 temperature held a constant amount lower than the surface 26 temperature. For the latter application, it may be well to have the surface 12 temperature held the same as the surface 26 temperature, since the initial frost formation is deemed not to be dangerous, but repeated warnings of "ice ahead" could cause drivers who do not experience such ice to become unresponsive to the warning.

In many applications, such as the highway application just referred to, it is necessary to be concerned about the possibility of ice formation as a result of precipitation, which may occur at times when the temperature of the surface is not a sufficient amount below ambient, at a particular relative humidity of the air at the surface for condensation to occur.

Thus, a more complete ice detecting system for highway or, if desired, for aircraft applications, would include means for detecting the presence of ice resulting from any precipitation which might occur at below freezing temperatures, or any remnant precipitation which might have occurred previously under any conditions.

Such precipitation can be detected, for example, by measuring the electrical resistance of water, as compared to the resistance of ice, water having low resistance and ice having high resistance. The pairs of electrodes in probes 20 and 22 may be used for this purpose, both pairs of electrodes being imbedded directly into the road surface 26 or adjacent thereto, with the electrodes being exposed to road conditions so as to be capable of providing an indication of the exact road surface conditions.

More specifically, the heating element 21 for the probe 20 maintains the area in the vicinity of the exposed end of the probe at a temperature above freezing. So long as free water, such as rain, lies upon both probes 20 and 22, the corresponding resistance will be low for both. Should the surface 26 temperature fall below freezing during or after the precipitation period, obviously ice would form on top of the probe 22, while water would remain above the heated probe 20. The corresponding relative low and high resistances may, of course, be used as signals transmitted via the lines 34 and 36 to the control unit 40, indicating surface ice, regardless of what may be happening by way of condensation.

Upon receiving such a signal, the control unit 40 will, any time that the temperature signal from the transducer 24 via the line 38 indicates a surface 26 temperature lower than freezing, provide a signal to the device 44, for the same purpose as described above relative to a condensation signal from the probe 16.

Occasionally it may become necessary to prevent or detect frost or ice formation on an isolated or remote surface, such as inside a pipe line, for example. In this case, a modified system 50, as illustrated in FIGURE 2, may be employed. In the system 50, all elements which are identical to elements in FIGURE 1 will bear like reference numerals. The additional elements include a wall or other enclosure 52 which may surround or isolate the selected surface 26.

Since the atmosphere surrounding the surface 26 in such an enclosure may be considerably different from that surrounding the controlled surface 12, it is essential that a sample of that atmosphere be communicated to the surface 12. This may be accomplished by the use of a small vacuum pump 54 associated with surface 26, a chamber 56 associated with surface 12, and a conduit 58 communicating therebetween, surface 12 being confined within or forming a wall of the chamber 56. The atmospheric sample may then either be returned via a conduit 60 to the enclosure 52 or dumped in the vicinity of the surface 12. Otherwise, the elements 14, 16, 18, 20, 21, 22 and 24 function in the same manner as described above relative to the FIGURE 1 structure.

It should be apparent that the atmospheric condition indicating systems 10 and 50 provide novel and yet simplified means for either detecting the presence of frost or ice, formed by way of condensation and precipitation, respectively, or preventing the formation of such frost or ice on any selected surface, whether exposed or enclosed, without having to measure relative humidity or saturation temperature directly, or to constantly create a saturation temperature for reference.

While but two embodiments of the invention have been shown and described, it is apparent that other modifications of the invention are possible.

What I claim as my invention is:

1. An atmospheric condition anticipating device for use with a first selected surface, said device comprising a second surface, means for sensing the temperatures of said surfaces, means for continuously maintaining the temperature of said second surface in a predetermined relationship to the temperature of said selected surface, additional means for sensing the presence of condensation, frost, ice, snow or water on said second surface, and means for producing an output when condensation, frost, ice, snow or water has formed on said second surface and the temperature of said first selected surface is below a predetermined value.

2. The device described in claim 1, including, additionally, means for sensing the presence of liquid water, snow or ice on said first selected surface and producing an output when the temperature of said selected surface is below said predetermined value.

3. The device described in claim 2, wherein said additional means includes a pair of heated electrodes and a pair of unheated electrodes.

4. The device described in claim 2, including, additionally, means for communicating a sample of the air surrounding said first selected surface to said second surface.

5. The device described in claim 4, wherein said additional means includes a pump.

6. The device described in claim 1, wherein said means for sensing the temperatures of said surfaces are temperature transducers.

7. The device described in claim 1, wherein said means for sensing the presence of condensation, frost, ice, snow or water includes a pair of electrodes.

8. The device described in claim 1, wherein said second surface comprises glass cloth filled with an epoxy-type resin material.

9. An atmospheric condition anticipating device for use with a first selected surface, said device comprising a second surface, said second surface comprising glass cloth filled with an epoxy-type resin material, means for maintaining the temperature of said second surface a predetermined amount different from the temperature of said selected surface, means for sensing the presence of condensation, frost, ice, snow or water on said second surface, and means for producing an output when condensation, frost, ice, snow or water has formed on said second surface and the temperature of said first selected surface is below a predetermined value.

10. An atmospheric condition anticipating device for use with a first selected surface, said device comprising a second surface, means for sensing the temperatures of said surfaces, means for maintaining the temperature of said second surface a predetermined amount different from the temperature of said selected surface, means for sensing the presence of condensation, frost, ice, snow or water on said second surface, means for producing an output when condensation, frost, ice, snow or water has formed on said second surface and the temperature of said first selected surface is below a predetermined value, and additional means for sensing the presence of liquid water, snow or ice on said first selected surface for producing an output when the temperature of said selected surface is below said predetermined value, said additional means comprising a pair of heated electrodes and a pair of unheated electrodes.

11. An atmospheric condition anticipating device for use with a first selected surface, said device comprising a second surface, means for sensing the temperatures of said surfaces, means for maintaining the temperature of said second surface a predetermined amount different from the temperature of said selected surface, means for sensing the presence of condensation, frost, ice, snow or water on said second surface, means for producing an output when condensation, frost, ice, snow or water has formed on said second surface and the temperature of said first selected surface is below a predetermined value, means for sensing the presence of liquid water, snow or ice on said first selected surface for producing an output when the temperature of said selected surface is below said predetermined value, and additional means for communicating a sample of the air surrounding said first selected surface to said second surface.

12. An atmospheric condition anticipating device according to claim 11 wherein said additional means comprises a pump.

References Cited

UNITED STATES PATENTS

| | | | |
|---|---|---|---|
| 3,164,820 | 1/1965 | Hulett | 200—61.04 |
| 3,277,459 | 10/1966 | Werner | 340—234 |
| 3,305,851 | 2/1967 | Brandtszteter | 73—336.5 |

LOUIS R. PRINCE, *Primary Examiner.*

D. E. CORR, *Assistant Examiner.*

U.S. Cl. X.R.

73—17, 336.5